(12) United States Patent
Yamamoto (10) Patent No.: US 11,628,685 B2
(45) Date of Patent: Apr. 18, 2023

(54) HUMAN-POWERED VEHICLE WHEEL UNIT AND HUMAN-POWERED VEHICLE WHEEL ASSEMBLY

(71) Applicant: Shimano Inc., Osaka (JP)

(72) Inventor: Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 390 days.

(21) Appl. No.: 16/832,338

(22) Filed: Mar. 27, 2020

(65) Prior Publication Data

US 2020/0338925 A1 Oct. 29, 2020

(30) Foreign Application Priority Data

Apr. 26, 2019 (JP) .............................. JP2019-085588

(51) Int. Cl.
*B60B 27/02* (2006.01)
*B60B 1/04* (2006.01)
*B62L 1/06* (2006.01)

(52) U.S. Cl.
CPC ............ *B60B 27/023* (2013.01); *B60B 1/041* (2013.01); *B62L 1/06* (2013.01)

(58) Field of Classification Search
CPC ......... B60B 7/14; B60B 7/061; B60B 7/0006; B60B 27/023; B60B 27/0047; B60B 27/0052; B60B 1/041; B60B 1/042; B62J 23/00; B62L 1/06
See application file for complete search history.

(56) References Cited

U.S. PATENT DOCUMENTS

| 1,334,153 | A | * | 3/1920 | Hanch et al. | ........... B60B 23/04 301/11.1 |
|---|---|---|---|---|---|
| 2004/0075333 | A1 | * | 4/2004 | Shih | ........................ B60B 7/061 301/37.41 |
| 2006/0006732 | A1 | * | 1/2006 | Fukui | ........................ B60B 7/08 301/110.5 |
| 2006/0208558 | A1 | * | 9/2006 | Fukui | ....................... B62K 25/02 301/5.309 |
| 2006/0208561 | A1 | * | 9/2006 | Fukui | ........................ B60B 7/14 301/110.5 |

FOREIGN PATENT DOCUMENTS

| DE | 202009003831 U1 * | 7/2009 | ............. B60B 1/041 |
|---|---|---|---|
| EP | 1733957 A2 * | 12/2006 | ............. B60L 50/20 |
| JP | 2007-62718 A | 3/2007 | |

* cited by examiner

*Primary Examiner* — Kip T Kotter
(74) *Attorney, Agent, or Firm* — Global IP Counselors, LLP (57) ABSTRACT

A human-powered vehicle wheel unit adapted to be attached to a human-powered vehicle hub. The wheel unit includes an accommodation portion and a first engagement portion. The accommodation portion is configured to accommodate at least part of the human-powered vehicle hub. The first engagement portion is provided on the accommodation portion. The first engagement portion is configured to transmit rotation of the human-powered vehicle hub to the accommodation portion through engagement with a second engagement portion provided on a flange projecting from an outer circumferential portion of a hub shell of the human-powered vehicle hub.

33 Claims, 7 Drawing Sheets

HUMAN-POWERED VEHICLE WHEEL UNIT AND HUMAN-POWERED VEHICLE WHEEL ASSEMBLY

CROSS-REFERENCE TO RELATED APPLICATIONS

This application claims priority to Japanese Patent Application No. 2019-085588, filed on Apr. 26, 2019. The entire disclosure of Japanese Patent Application No. 2019-085588 is hereby incorporated herein by reference.

BACKGROUND

Technical Field

The present invention generally relates to a human-powered vehicle wheel unit and a human-powered vehicle wheel assembly.

Background Information

For example, Japanese Laid-Open Patent Publication No. 2007-62718 discloses a hub body of a hub of a human-powered vehicle that includes a plurality of holes for coupling of spokes of a wheel.

SUMMARY

One object of the present disclosure is to provide a human-powered vehicle wheel unit and a human-powered vehicle wheel assembly that improve usability.

A human-powered vehicle wheel unit in accordance with a first aspect of the present disclosure is adapted to be attached to a human-powered vehicle hub. The human-powered vehicle wheel unit comprises an accommodation portion and a first engagement portion. The accommodation portion is configured to accommodate at least part of the human-powered vehicle hub. The first engagement portion is provided on the accommodation portion. The first engagement portion is configured to transmit rotation of the human-powered vehicle hub to the accommodation portion through engagement with a second engagement portion provided on a flange projecting from an outer circumferential portion of a hub shell of the human-powered vehicle hub.

The human-powered vehicle wheel unit according to the first aspect allows a user to readily transmit rotation of the human-powered vehicle hub to the accommodation portion of the human-powered vehicle wheel unit through engagement of the first engagement portion, which is provided on the accommodation portion that accommodates at least part of the human-powered vehicle hub, and the second engagement portion. This improves usability.

In accordance with a second aspect of the present disclosure, the human-powered vehicle wheel unit according to the first aspect is configured so that one of the first engagement portion and the second engagement portion includes a plurality of projections projecting in an axial direction of the human-powered vehicle hub. The other one of the first engagement portion and the second engagement portion includes a plurality of holes or a plurality of recesses engaged with the projections.

The human-powered vehicle wheel unit according to the second aspect allows a user to readily engage the first engagement portion and the second engagement portion through engagement of the projections and the holes or the recesses.

A human-powered vehicle wheel unit in accordance with a third aspect of the present disclosure is a human-powered vehicle wheel unit adapted to be attached to a human-powered vehicle hub. The human-powered vehicle wheel unit comprises an accommodation portion and a first engagement portion. The accommodation portion is configured to accommodate at least part of the human-powered vehicle hub. The first engagement portion is provided on the accommodation portion. The first engagement portion is configured to transmit rotation of the human-powered vehicle hub to the accommodation portion through engagement with a second engagement portion provided on the human-powered vehicle hub. One of the first engagement portion and the second engagement portion includes a plurality of projections projecting in an axial direction of the human-powered vehicle hub. The other one of the first engagement portion and the second engagement portion includes a plurality of holes or a plurality of recesses engaged with the projections.

The human-powered vehicle wheel unit according to the third aspect transmits the rotation of the human-powered vehicle hub to the accommodation portion in a preferred manner through engagement of projections projecting in the axial direction of the human-powered vehicle hub and the holes or the recesses. This improves usability.

In accordance with a fourth aspect of the present disclosure, the human-powered vehicle wheel unit according to the third aspect is configured so that the second engagement portion is provided on a flange projecting from an outer circumferential portion of a hub shell of the human-powered vehicle hub.

The human-powered vehicle wheel unit according to the fourth aspect allows a user to readily engage the first engagement portion and the second engagement portion through engagement of the second engagement portion provided on the flange with the first engagement portion.

In accordance with a fifth aspect of the present disclosure, the human-powered vehicle wheel unit according to any one of the second to fourth aspects is configured so that the accommodation portion includes a first portion and a second portion that is attached to the first portion.

With the human-powered vehicle wheel unit according to the fifth aspect, at least part of the human-powered vehicle hub can readily be accommodated in the accommodation portion by removing the first portion from the second portion.

In accordance with a sixth aspect of the present disclosure, the human-powered vehicle wheel unit according to the fifth aspect is configured so that the first portion and the second portion are aligned in an axial direction of the human-powered vehicle hub. The first portion includes a first wall configured to contact a first end surface of the human-powered vehicle hub in the axial direction of the human-powered vehicle hub. The second portion includes a second wall configured to contact a second end surface of the human-powered vehicle hub in the axial direction of the human-powered vehicle hub. The second portion is attached to the first portion in a state in which at least part of the human-powered vehicle hub is accommodated in the accommodation portion so that the accommodation portion restricts movement of the human-powered vehicle hub relative to the accommodation portion in the axial direction.

The human-powered vehicle wheel unit according to the sixth aspect stably attaches the human-powered vehicle hub to the human-powered vehicle wheel unit.

In accordance with a seventh aspect of the present disclosure, the human-powered vehicle wheel unit according to the sixth aspect is configured so that the projections are provided on each of the first portion and the second portion.

The human-powered vehicle wheel unit according to the seventh aspect transmits the rotation of the human-powered vehicle hub to the accommodation portion of the human-powered vehicle wheel unit in a preferred manner.

In accordance with an eighth aspect of the present disclosure, the human-powered vehicle wheel unit according to the seventh aspect is configured so that the projections are provided on each of the first wall of the first portion and the second wall of the second portion.

With the human-powered vehicle wheel unit according to the eighth aspect, the projections are provided on the first wall of the first portion and the second wall of the second portion in a preferred manner.

In accordance with a ninth aspect of the present disclosure, the human-powered vehicle wheel unit according to the eighth aspect is configured so that the number of the projections provided on the first wall and the number of the projections provided on the second wall are each included in a range of 10 or greater to 25 or less.

The human-powered vehicle wheel unit according to the ninth aspect transmits the rotation of the human-powered vehicle hub to the accommodation portion of the human-powered vehicle wheel unit in a preferred manner with the 10 or greater to 25 or less projections, which are provided on each of the first wall and the second wall.

In accordance with a tenth aspect of the present disclosure, the human-powered vehicle wheel unit according to the eighth or ninth aspect is configured so that the projections are provided on each of the first wall and the second wall in a circumferential direction of the human-powered vehicle hub.

With the human-powered vehicle wheel unit according to the tenth aspect transmits the rotation of the human-powered vehicle hub to the accommodation portion of the human-powered vehicle wheel unit with the projections provided in the circumferential direction of the human-powered vehicle hub.

In accordance with an eleventh aspect of the present disclosure, the human-powered vehicle wheel unit according to the tenth aspect is configured so that the projections are provided on the first wall with a phase in a circumferential direction of the human-powered vehicle wheel unit differing from that of the projections provided on the second wall.

With the human-powered vehicle wheel unit according to the eleventh aspect, the phase difference allows for transmission of the rotation of the human-powered vehicle hub to the accommodation portion of the human-powered vehicle wheel unit in a preferred manner.

In accordance with a twelfth aspect of the present disclosure, the human-powered vehicle wheel unit according to any one of the seventh to eleventh aspects is configured so that the projections are provided on each of the first wall and the second wall along a circle having a diameter included in a range of 50 millimeters or greater to 300 millimeters or less.

The human-powered vehicle wheel unit according to the twelfth aspect transmits the rotation of the human-powered vehicle hub to the accommodation portion of the human-powered vehicle wheel unit in a preferred manner with the projections, which are provided on each of the first wall and the second wall along a circle having a diameter included in a range of 50 millimeters or greater to 300 millimeters or less.

In accordance with a thirteenth aspect of the present disclosure, the human-powered vehicle wheel unit according to the twelfth aspect is configured so that the projections are provided on each of the first wall and the second wall along a circle having a diameter included in a range of 50 millimeters or greater to 120 millimeters or less.

The human-powered vehicle wheel unit according to the thirteenth aspect transmits the rotation of the human-powered vehicle hub to the accommodation portion of the human-powered vehicle wheel unit in a preferred manner with the projections, which are provided on each of the first wall and the second wall along a circle having a diameter included in a range of 50 millimeters or greater to 120 millimeters or less.

In accordance with a fourteenth aspect of the present disclosure, the human-powered vehicle wheel unit according to any one of the seventh to thirteenth aspects is configured so that the first wall and the second wall are spaced apart by a distance included in a range of 40 millimeters or greater to 70 millimeters or less.

The human-powered vehicle wheel unit according to the fourteenth aspect spaces apart the first wall and the second wall by the distance included in the range of 40 millimeters or greater to 70 millimeters or less.

In accordance with a fifteenth aspect of the present disclosure, the human-powered vehicle wheel unit according to any one of the seventh to fourteenth aspects is configured so that the first portion further includes a circumferential wall that is continuous with the first wall and surrounds an outer circumferential portion of the human-powered vehicle hub. The second portion is attached to an end of the circumferential wall on a side opposite to the first wall in the axial direction of the human-powered vehicle hub.

The human-powered vehicle wheel unit according to the fifteenth aspect accommodates at least part of the human-powered vehicle hub in a space defined by the first wall, the circumferential wall, and the second wall.

In accordance with a sixteenth aspect of the present disclosure, the human-powered vehicle wheel unit according to the fifteenth aspect is configured so that the projections are spaced apart from the circumferential wall.

The human-powered vehicle wheel unit according to the sixteenth aspect facilitates engagement of the first engagement portion and the second engagement portion.

In accordance with a seventeenth aspect of the present disclosure, the human-powered vehicle wheel unit according to the fifteenth or sixteenth aspect is configured so that the circumferential wall includes a large diameter portion having an inner diameter defining a first inner diameter and a small diameter portion having an inner diameter defining a second inner diameter that is smaller than the first inner diameter.

With the human-powered vehicle wheel unit according to the seventeenth aspect, the circumferential wall includes the large diameter portion and the small diameter portion.

In accordance with an eighteenth aspect of the present disclosure, the human-powered vehicle wheel unit according to any one of the seventh to seventeenth aspects is configured so that the second portion is configured to be separable into a first segment and a second segment.

With the human-powered vehicle wheel unit according to the eighteenth aspect, the first segment and the second segment can be attached to the first portion separately.

In accordance with a nineteenth aspect of the present disclosure, the human-powered vehicle wheel unit according to any one of the seventh to eighteenth aspects further comprises one or more attaching members that attach the first portion and the second portion. The number of the one or more attaching members is less than the number of the projections.

The human-powered vehicle wheel unit according to the nineteenth aspect facilitates attachment of the first portion and the second portion.

In accordance with a twentieth aspect of the present disclosure, the human-powered vehicle wheel unit according to the nineteenth aspect is configured so that the attaching members are provided on the accommodation portion outward from the first engagement portion with respect to a radial direction of the human-powered vehicle hub.

The human-powered vehicle wheel unit according to the twentieth aspect allows for attachment of the first portion and the second portion at the outer side of the first engagement portion in the radial direction of the human-powered vehicle hub.

In accordance with a twenty-first aspect of the present disclosure, the human-powered vehicle wheel unit according to any one of the second to twentieth aspects is configured so that the projections are a plurality of pin members extending in the axial direction of the human-powered vehicle hub.

With the human-powered vehicle wheel unit according to the twenty-first aspect, insertion of the pin members into the holes or the recesses readily engages the first engagement portion with the second engagement portion.

In accordance with a twenty-second aspect of the present disclosure, the human-powered vehicle wheel unit according to the twenty-first aspect is configured so that the pin members each have a diameter of 1 millimeter or greater and 5 millimeters or less.

The human-powered vehicle wheel unit according to the twenty-second aspect transmits the rotation of the human-powered vehicle hub to the accommodation portion of the human-powered vehicle wheel unit in a preferred manner with pin members each having a diameter of 1 millimeter or greater and 5 millimeters or less.

In accordance with a twenty-third aspect of the present disclosure, the human-powered vehicle wheel unit according to the twenty-first or the twenty-second aspect is configured so that the pin members each have an axial length of 1 millimeter or greater and 20 millimeters or less.

The human-powered vehicle wheel unit according to the twenty-third aspect readily engages the first engagement portion with the second engagement portion with insertion of the pin members, each of which has an axial length of 1 millimeter or greater and 20 millimeters or less, into the holes or the recesses.

In accordance with a twenty-fourth aspect of the present disclosure, the human-powered vehicle wheel unit according to any one of the twenty-first to twenty-third aspects is configured so that the pin members are formed integrally with the accommodation portion.

With the human-powered vehicle wheel unit according to the twenty-fourth aspect, the pin members can be formed integrally with the accommodation portion.

In accordance with a twenty-fifth aspect of the present disclosure, the human-powered vehicle wheel unit according to the first or fourth aspect is configured so that the accommodation portion includes a first portion and a second portion attached to the first portion. The first portion and the second portion are aligned in the axial direction of the human-powered vehicle hub. The first portion includes a first wall configured to contact a first end surface of the human-powered vehicle hub in the axial direction of the human-powered vehicle hub. The second portion includes a second wall configured to contact a second end surface of the human-powered vehicle hub in the axial direction of the human-powered vehicle hub. The second portion is attached to the first portion in a state in which at least part of the human-powered vehicle hub is to be accommodated in the accommodation portion so that the accommodation portion restricts movement of the human-powered vehicle hub relative to the accommodation portion in the axial direction when the human-powered vehicle hub is attached to the accommodation portion. The flange of the human-powered vehicle hub includes a first flange and a second flange. The second flange is located in the axial direction of the human-powered vehicle hub at a position differing from that of the first flange. The first end surface is provided on the first flange, and the second end surface is provided on the second flange.

With the human-powered vehicle wheel unit according to the twenty-fifth aspect, in a case where the first portion is attached to the second portion, the first end surface contacts the first flange and the second end surface contacts the second flange. This stably attaches the human-powered vehicle hub to the human-powered vehicle wheel unit.

In accordance with a twenty-sixth aspect of the present disclosure, the human-powered vehicle wheel unit according to any one of the first to twenty-fifth aspects further comprises a plurality of spokes. The accommodation portion further includes a plurality of spoke engagement portions engaged with the spokes.

The human-powered vehicle wheel unit according to the twenty-sixth aspect improves usability of the human-powered vehicle wheel unit including a plurality of spokes.

In accordance with a twenty-seventh aspect of the present disclosure, the human-powered vehicle wheel unit according to any one of the second to twenty-fourth aspects further comprises a plurality of spokes. The accommodation portion further includes a plurality of spoke engagement portions engaged with the spokes. The spoke engagement portions are equal in number to the projections.

With the human-powered vehicle wheel unit according to the twenty-seventh aspect, the spoke engagement portions are equal in number to the projections.

In accordance with a twenty-eighth aspect of the present disclosure, the human-powered vehicle wheel unit according to the nineteenth or twentieth aspect further comprises a plurality of spokes. The accommodation portion further includes a plurality of spoke engagement portions engaged with the spoke. The attaching members are less in number than the spoke engagement portions.

The human-powered vehicle wheel unit according to the twenty-eighth aspect facilitates attachment of the first portion and the second portion.

In accordance with a twenty-ninth aspect of the present disclosure, the human-powered vehicle wheel unit according to any one of the first to twenty-eighth aspects further comprises a restriction portion that restricts movement of the human-powered vehicle hub relative to the human-powered vehicle wheel unit by sandwiching the human-powered vehicle hub from one side and another side in the axial direction of the human-powered vehicle hub.

With the human-powered vehicle wheel unit according to the twenty-ninth aspect, the restriction portion restricts movement of the human-powered vehicle hub relative to the human-powered vehicle wheel unit in a preferred manner.

In accordance with a thirtieth aspect of the present disclosure, the wheel unit according to any one of the first to twenty-ninth aspects further comprises a human-powered vehicle component attachment.

The human-powered vehicle wheel unit according to the thirtieth aspect attaches the human-powered vehicle component to the human-powered vehicle wheel unit using the human-powered vehicle component attachment structure.

In accordance with a thirty-first aspect of the present disclosure, the human-powered vehicle wheel unit according to the thirtieth aspect is configured so that the human-powered vehicle attachment structure includes a groove or a hole provided in an end of the accommodation portion to attach a braking device.

The human-powered vehicle wheel unit according to the thirty-first aspect attaches the human-powered vehicle component to the human-powered vehicle wheel unit with the groove or the hole.

A human-powered vehicle wheel assembly in accordance with a thirty-second aspect of the present disclosure comprises the human-powered vehicle wheel unit according to any one of the first to thirty-first aspects and the human-powered vehicle hub.

The human-powered vehicle wheel assembly according to the thirty-second aspect improves usability.

The human-powered vehicle wheel unit and the human-powered vehicle wheel assembly of the present disclosure improve usability.

BRIEF DESCRIPTION OF THE DRAWINGS

Referring now to the attached drawings which form a part of this original disclosure.

DETAILED DESCRIPTION OF EMBODIMENT

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

A human-powered vehicle wheel assembly 40 and a human-powered vehicle wheel unit 60 in accordance with one embodiment will now be described with reference to FIGS. 1 to 7. A human-powered vehicle 10 is a vehicle that can be driven by at least human driving force. There is no limit to the number of wheels of the human-powered vehicle 10. For example, the human-powered vehicle 10 can be a unicycle or a vehicle having three or more wheels. Examples of the human-powered vehicle 10 include various types of bicycles such as a mountain bike, a road bike, a city bike, a cargo bike, and a recumbent bicycle, as well as an electric bicycle (E-bike). The electric bicycle includes an electric assist bicycle that assists propulsion of the vehicle with an electric motor. In the embodiment described hereafter, the human-powered vehicle 10 will be referred to as a bicycle.

Figure 1:
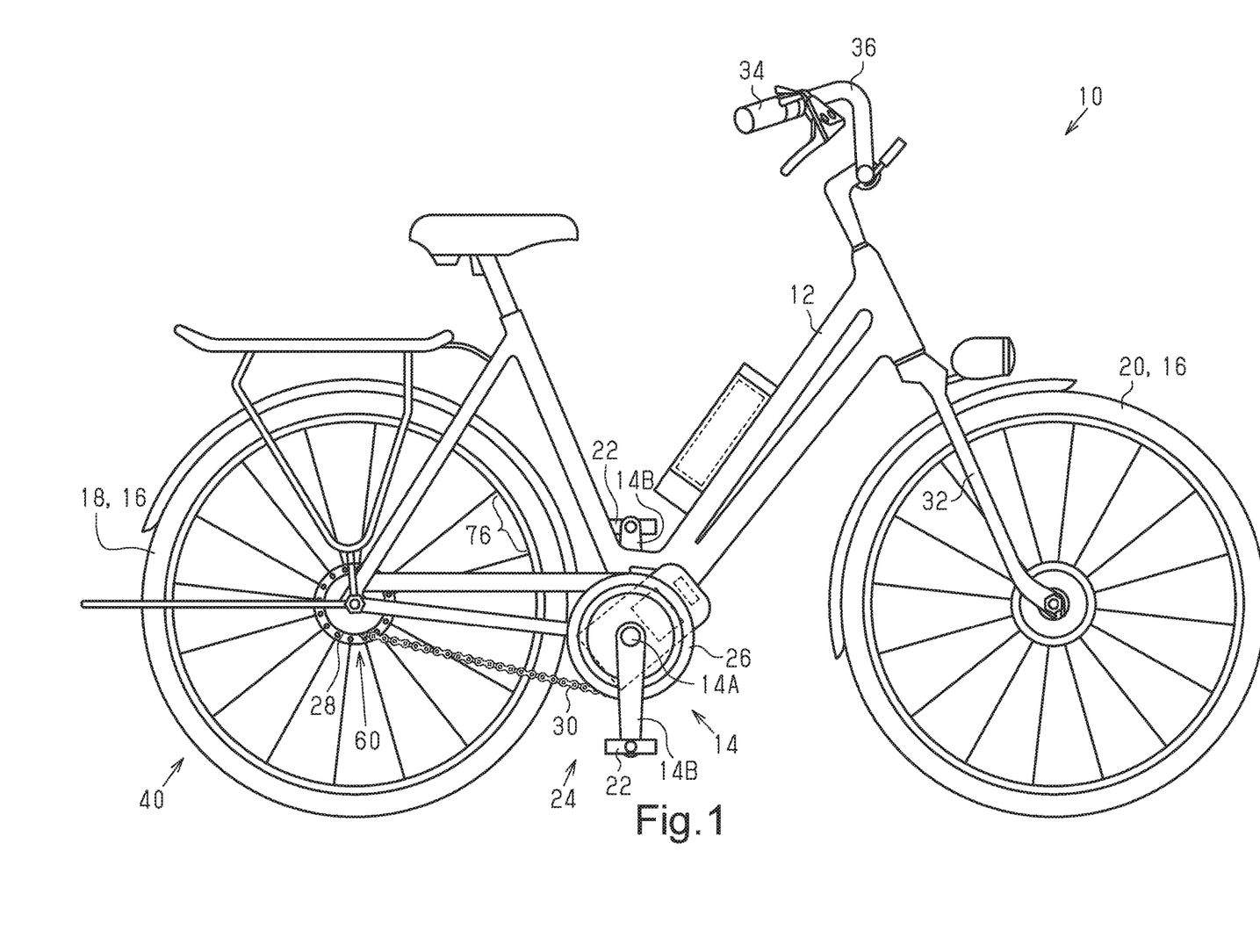
FIG. 1 is a side elevational view of a human-powered vehicle including a human-powered vehicle wheel unit and a human-powered vehicle wheel assembly in accordance with one embodiment.

The human-powered vehicle 10 includes a frame 12, a crank 14, and a wheel 16. The wheel 16 includes a driving wheel 18 and a driven wheel 20. The human driving force is input to the crank 14. The crank 14 includes a crankshaft 14A and two crank arms 14B. The crankshaft 14A is rotatably supported by the frame 12. The two crank arms 14B are provided on two ends of the crankshaft 14A, respectively. Two pedals 22 are connected to the two crank arms 14B, respectively. The driving wheel 18 is driven by the rotation of the crank 14. The driving wheel 18 is supported by the frame 12. The crank 14 is connected to the driving wheel 18 by a drive mechanism 24. The drive mechanism 24 includes a first rotary body 26 connected to the crankshaft 14A. The crankshaft 14A can be connected to the first rotary body 26 by a first one-way clutch. The first one-way clutch is configured to rotate the first rotary body 26 forward in a case where the crank 14 is rotated forward and configured not to rotate the first rotary body 26 rearward in a case where the crank 14 is rotated rearward. The first rotary body 26 includes a sprocket, a pulley, or a bevel gear. The drive mechanism 24 further includes a second rotary body 28 and a linking member 30. The linking member 30 transmits rotational force of the first rotary body 26 to the second rotary body 28. The linking member 30 includes, for example, a chain, a belt, or a shaft.

The second rotary body 28 is connected to the driving wheel 18. The second rotary body 28 includes a sprocket, a pulley, or a bevel gear. Preferably, a second one-way clutch is provided between the second rotary body 28 and the driving wheel 18. The second one-way clutch is configured to rotate the driving wheel 18 forward in a case where the second rotary body 28 is rotated forward and configured not to rotate the driving wheel 18 rearward in a case where the second rotary body 28 is rotated rearward.

One of the driving wheel 18 and the driven wheel 20 includes a front wheel, and the other one of the driving wheel 18 and the driven wheel 20 includes a rear wheel. The front wheel is attached to the frame 12 by a front fork 32. A handlebar 34 is connected to the front fork 32 by a stem 36. In the following embodiment, the rear wheel will be referred to as the driving wheel 18, but the front wheel can be the driving wheel 18.

Figure 2:
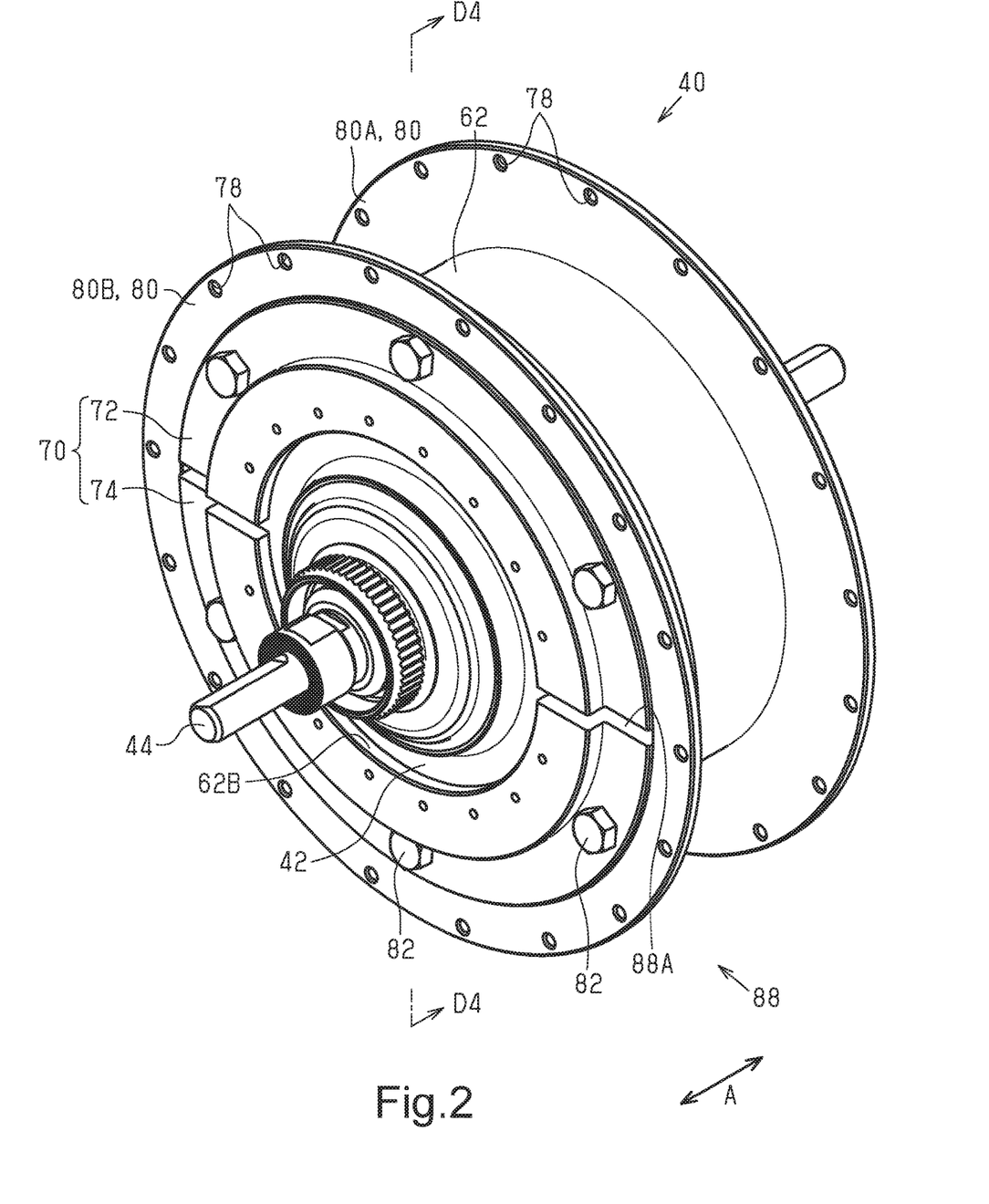
FIG. 2 is a perspective view of the human-powered vehicle wheel assembly shown in FIG. 1.

The human-powered vehicle wheel assembly 40 includes the human-powered vehicle wheel unit 60 and a human-powered vehicle hub 42 (hereinafter referred to as the hub 42 for simplicity). The wheel assembly 40 can be the wheel assembly 40 of the driving wheel 18 or the wheel assembly 40 of the driven wheel 20. In the present embodiment, the wheel assembly 40 is the wheel assembly 40 of the driving wheel 18.

Figure 3:
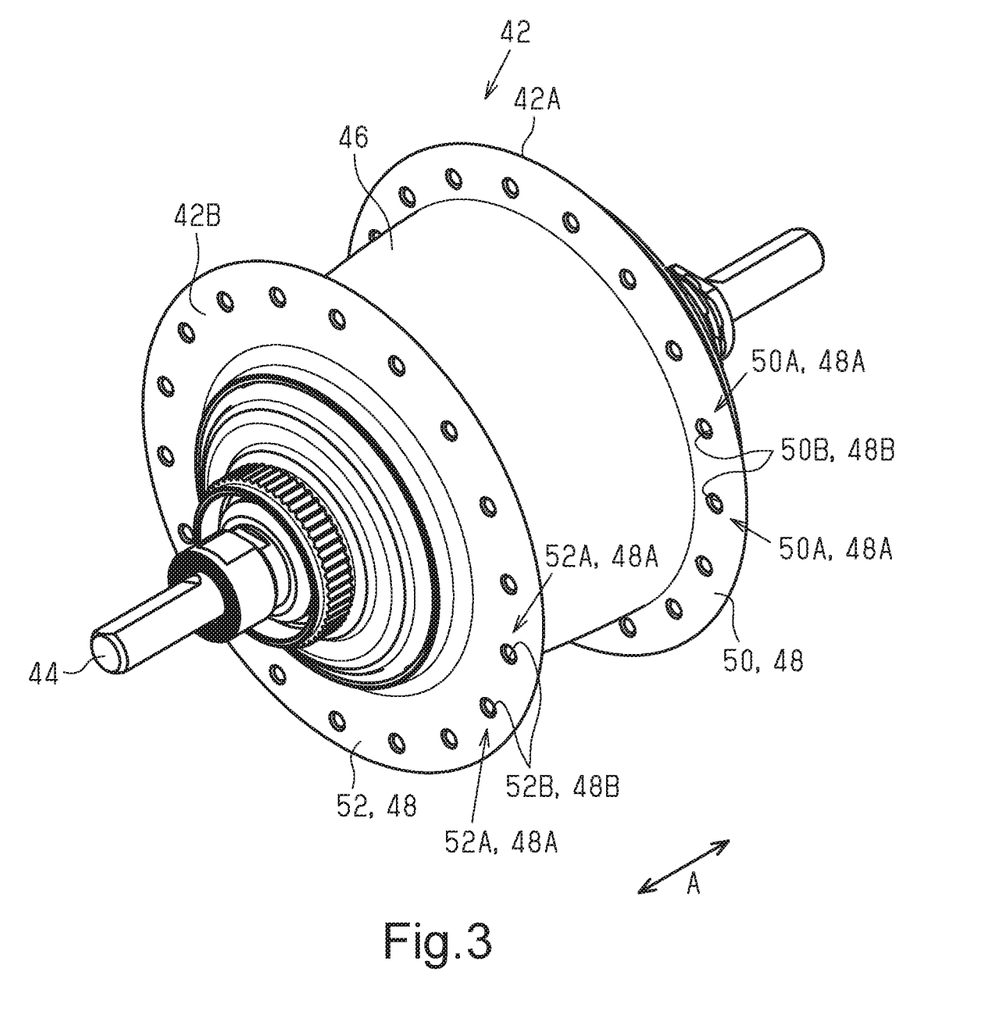
FIG. 3 is a perspective view of a human-powered vehicle hub of the human-powered vehicle wheel assembly shown in FIGS. 1 and 2.

The hub 42 includes a hub shaft 44 and a hub shell 46. The hub shaft 44 is rotatably supported by the frame 12. The hub shell 46 is rotatably supported by the hub shaft 44. The hub shell 46 is directly or indirectly connected to the second rotary body 28. The rotation of the second rotary body 28 is transmitted to the hub shell 46. Preferably, an internal transmission device is provided between the second rotary body 28 and the hub shell 46 in a path through which the rotational force is transmitted. The internal transmission device is provided inside the hub shell 46. In addition to the internal transmission device, at least one of a dynamo, a freewheel mechanism, or a motor configured to assist propulsion of the human-powered vehicle can be provided inside the hub shell 46.

The hub shell 46 includes a flange 48 on an outer circumferential portion. The hub 42 includes a second engagement portion 48A. The second engagement portion 48A is provided on the flange 48 projecting from the outer circumferential portion of the hub shell 46 of the hub 42. The flange 48 includes the second engagement portion 48A. The flange 48 of the hub 42 includes a first flange 50 and a second flange 52. The second flange 52 is located in an axial direction A of the hub 42 at a position differing from the first flange 50. The second engagement portion 48A includes a plurality of holes 48B extending through the flange 48 in the axial direction A of the hub 42. The second engagement portion 48A includes a second engagement portion 50A provided on the first flange 50 and a second engagement portion 52A provided on the second flange 52. The holes 48B includes a plurality of holes 50B extending through the first flange 50 in the axial direction A of the hub 42 and a plurality of holes 52B extending through the second flange 52 in the axial direction A of the hub 42. The holes 50B are formed in the first flange 50 in a circumferential direction of the first flange 50. The holes 52B are formed in the second flange 52 in the circumferential direction of the second flange 52. Preferably, the number of the holes 50B is equal to the number of the holes 52B. Preferably, the holes 50B and the holes 52B are formed in the first flange 50 and the second flange 52 so that the locations of the holes 50B are offset from the locations of the holes 52B in the circumferential direction. The holes 50B and the holes 52B are configured to couple spokes of a wheel of a typical human-powered vehicle.

Figure 4:
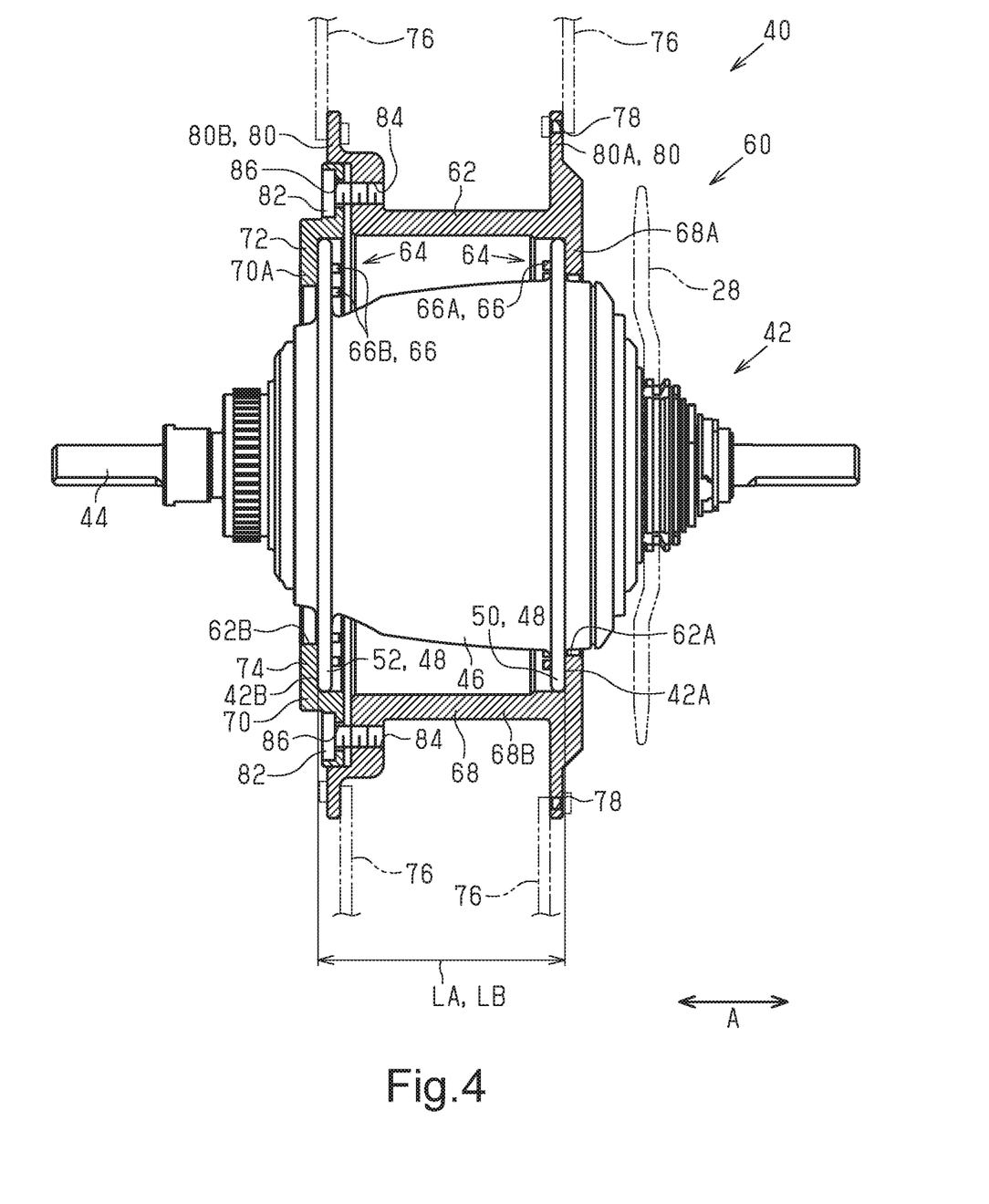
FIG. 4 is a cross-sectional view of an accommodation portion of the human-powered vehicle wheel assembly taken along line D4-D4 in FIG. 2 with the human-powered vehicle hub shown in elevation.

The wheel unit 60 is the human-powered vehicle wheel unit 60 to which the human-powered vehicle hub 42 is attached. The wheel unit 60 includes an accommodation portion 62 and a first engagement portion 64. The accommodation portion 62 accommodates at least part of the hub 42. The first engagement portion 64 is provided on the accommodation portion 62. The accommodation portion 62 is cylindrical. The accommodation portion 62 includes a first hole 62A formed in an end of the hub 42 in the axial direction A to expose an end of the hub shaft 44. The accommodation portion 62 includes a second hole 62B formed in the other end of the hub 42 in the axial direction A to expose the other end of the hub shaft 44.

The first engagement portion 64 is configured to transmit rotation of the hub 42 to the accommodation portion 62 through engagement with the second engagement portion 48A provided on the hub 42. The first engagement portion 64 is configured to transmit rotation of the hub 42 to the accommodation portion 62 through engagement with the second engagement portion 48A provided on the flange 48 projecting from the outer circumferential portion of the hub shell 46 of the hub 42.

One of the first engagement portion 64 and the second engagement portion 48A includes a plurality of projections 66 projecting in the axial direction A of the hub 42. The other one of the first engagement portion 64 and the second engagement portion 48A includes the holes 48B or a plurality of recesses engaged with the projections 66. In the present embodiment, the first engagement portion 64 includes the projections 66, and the second engagement portion 48A includes the holes 48B.

Figure 5:
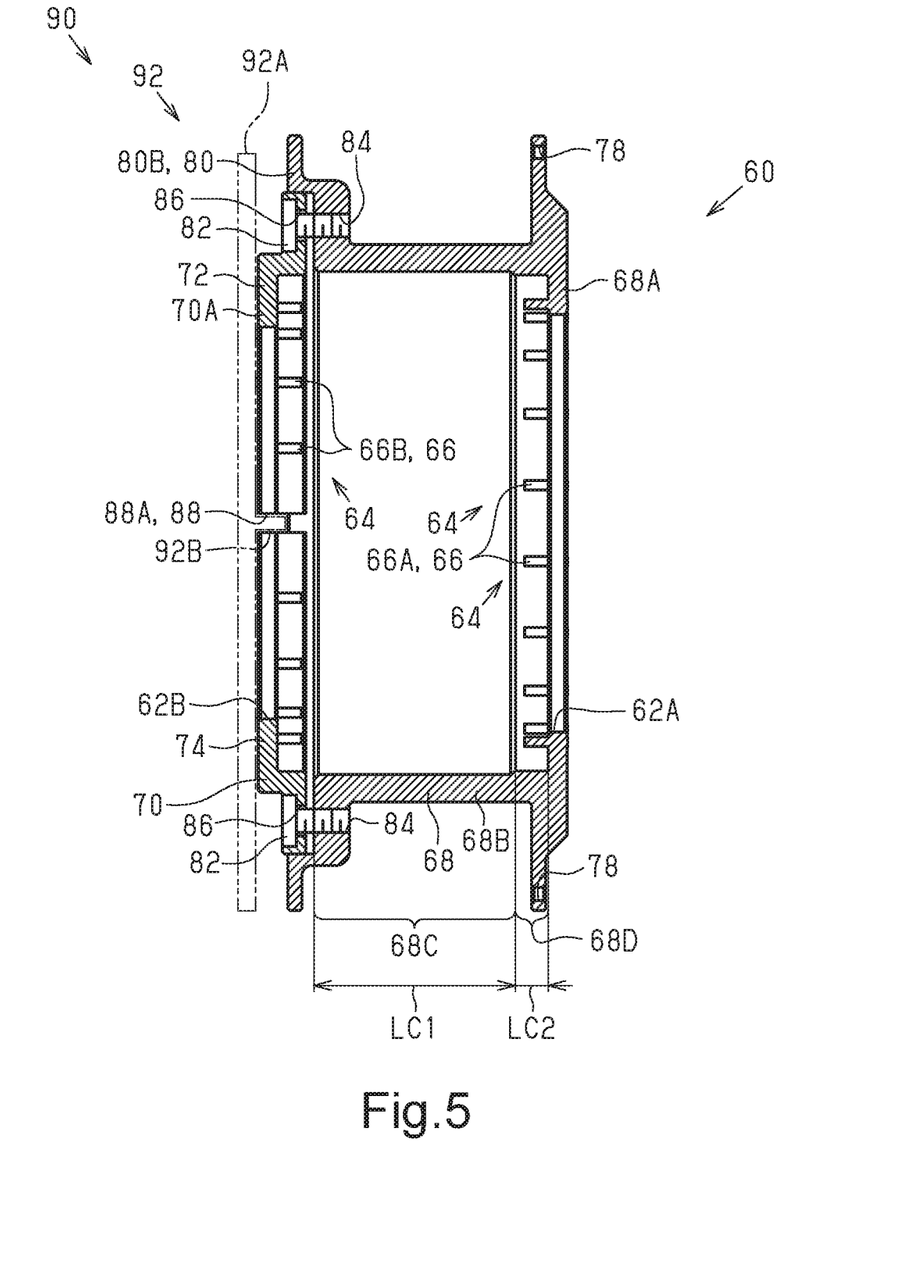
FIG. 5 is a cross-sectional view of the accommodation portion of the human-powered vehicle wheel assembly shown in FIG. 4 without the human-powered vehicle hub.

The accommodation portion 62 includes a first portion 68 and a second portion 70 attached to the first portion 68. The first portion 68 includes, for example, a metal material. The first portion 68 includes, for example, an aluminum alloy. The second portion 70 includes, for example, a metal material. The second portion 70 includes, for example, an aluminum alloy.

The first portion 68 and the second portion 70 are aligned in the axial direction A of the hub 42. The first portion 68 includes a first wall 68A configured to contact a first end surface 42A of the hub 42 in the axial direction A of the hub 42. The second portion 70 includes a second wall 70A configured to contact a second end surface 42B of the hub 42 in the axial direction A of the hub 42. The second portion 70 is attached to the first portion 68 in a state in which at least part of the hub 42 is accommodated in the accommodation portion 62 so that the accommodation portion 62 restricts movement of the hub 42 relative to the accommodation portion 62 in the axial direction. The first end surface 42A is provided on the first flange 50, and the second end surface 42B is provided on the second flange 52. The wheel unit 60 includes a restriction portion. The restriction portion restricts movement of the hub relative to the wheel unit 60 by sandwiching the hub 42 from one side and the other side in the axial direction A. The restriction portion is configured by the first wall 68A and the second wall 70A.

Figure 6:
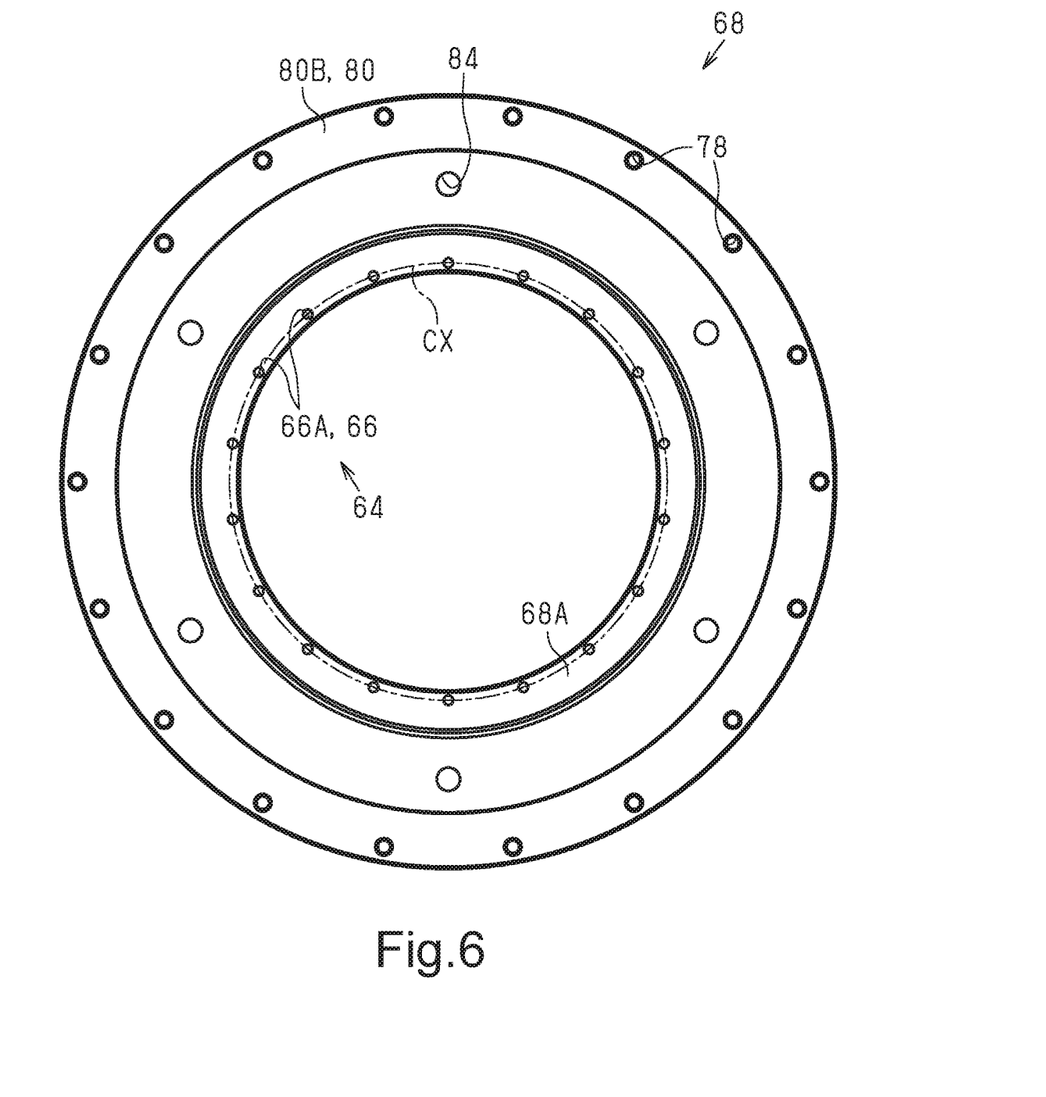
FIG. 6 is a side elevational view of a first portion of the accommodation portion for the human-powered vehicle wheel assembly shown in FIG. 2.
Figure 7:
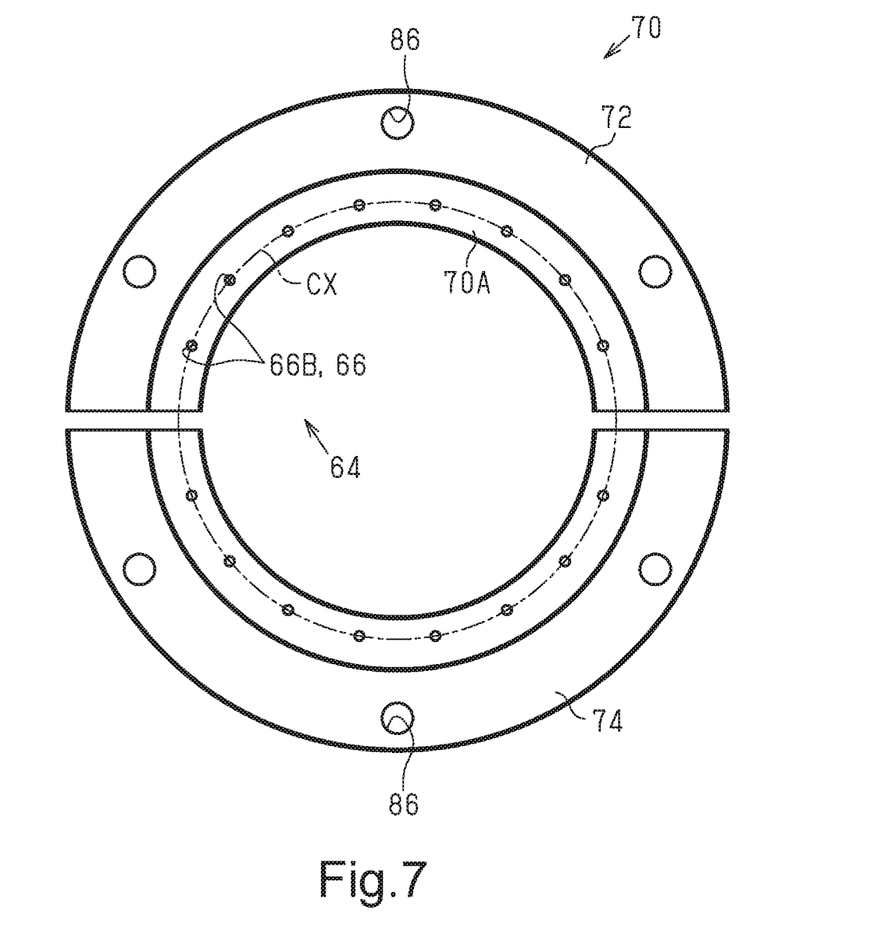
FIG. 7 is a side elevational view of a second portion of the accommodation portion for the human-powered vehicle wheel assembly in FIG. 2.

The projections 66 are provided on each of the first portion 68 and the second portion 70. The projections 66 are provided on each of the first wall 68A of the first portion 68 and the second wall 70A of the second portion 70. The projections 66 are provided on each of the first wall 68A and the second wall 70A in the circumferential direction of the hub 42. Preferably, the projections 66A are provided on the first wall 68A with a phase in the circumferential direction of the wheel unit 60 differing from that of the projections 66B provided on the second wall 70A in the circumferential direction of the wheel unit 60. Preferably, the projections 66A are provided in equal intervals in the circumferential direction of the wheel unit 60. Preferably, the projections 66B are provided in equal intervals in the circumferential direction of the wheel unit 60. Preferably, the phase difference of the projections 66A and the projections 66B in the circumferential direction of the wheel unit 60 is one-half of the phase difference of two adjacent projections 66A. In a case where the phase difference of the projections 66A and the projections 66B in the circumferential direction of the wheel unit 60 is set to one-half of the phase difference of two adjacent projections 66A, the rotation of the hub shell 46 is transmitted to the accommodation portion 62 in a preferred manner.

Preferably, the holes 50B are formed in equal intervals in the circumferential direction of the hub 42. Preferably, the holes 52B are formed in equal intervals in the circumferential direction of the hub 42. The holes 50B are provided in the first flange 50 with a phase in the circumferential direction of the hub 42 differing from that of the holes 52B provided in the second flange 52 in the circumferential direction of the hub 42. Preferably, the phase difference of the holes 50B and the holes 52B in the circumferential direction of the hub 42 is one-half of the phase difference of two adjacent holes 50B.

The projections 66 include the projections 66A, which are provided on the first wall 68A of the first portion 68, and the projections 66B, which are provided on the second wall 70A of the second portion 70. The projections 66A are configured to engage with the holes 50B. The projections 66B are configured to engage with the holes 52B. The projections 66A project from the first wall 68A toward the second wall 70A in a state in which the first portion 68 and the second portion 70 are attached to each other. The projections 66B project from the second wall 70A toward the first wall 68A in a state in which the first portion 68 and the second portion 70 are attached to each other.

Preferably, the projections 66 are provided on each of the first wall 68A and the second wall 70A along a circle CX having a diameter included in a range of 50 millimeters or greater to 300 millimeters or less. Further preferably, the projections 66 are provided on each of the first wall 68A and the second wall 70A along the circle CX having a diameter included in a range of 50 millimeter or greater to 120 millimeters or less. Preferably, the diameter of the circle CX corresponds to the number of holes formed in a flange of a typical hub for engagement with spokes.

The projections 66 are a plurality of pin members extending in the axial direction A of the hub 42. Preferably, the pin members are formed integrally with the accommodation portion 62. Here, a first set of the projections 66 (the pin members) are formed integrally as a single piece with the first wall 68A of the accommodation portion 62, and a second set of the projections 66 (the pin members) are formed integrally as a single piece with the second wall 70A of the accommodation portion 62. Preferably, the pin members each have a diameter of 1 millimeter or greater and 5 millimeters or less. The diameter of the pin member is, for example, 2 millimeters. Preferably, the pin members each have an axial length of 1 millimeter or greater and 20 millimeters or less. The axial length of the pin members is, for example, 5 millimeters. Preferably, a distance between two projections 66, which are adjacent to each other in the circumferential direction of the hub 42, is two times or more larger than the maximum diameter of the projection 66 in the circumferential direction of the hub 42.

The number of the projections 66 provided on the first wall 68A and the number of the projections 66 provided on the second wall 70A are each included in a range of 10 or greater to 25 or less. Preferably, the number of projections 66A is equal to the number of projections 66B. Preferably, the number of the projections 66A and the number of the projection 66B each correspond to the number of holes formed in a flange of a typical hub for engagement with spokes.

The first portion 68 is continuous with the first wall 68A and further includes a circumferential wall 68B that surrounds the outer circumferential portion of the hub 42. The second portion 70 is attached to an end of the outer circumferential wall 68B on a side opposite to the first wall 68A in the axial direction A of the hub 42. The outer circumferential wall 68B is cylindrical and extends in the axial direction A of the hub 42. The outer circumferential wall 68B has one end in the axial direction A of the hub 42 that is closed by the first wall 68A and the other end that is open. The opening in the other end of the outer circumferential wall 68B has an inner diameter that is greater than the diameter of the flange 48 of the hub 42.

Preferably, in a state in which the first portion 68 and the second portion 70 are attached to each other, the first wall 68A and the second wall 70A are spaced apart by a distance LA included in a range of 40 millimeters or greater to 70 millimeters or less. The distance LA is included, for example, in a range of 57 millimeters or greater to 59 millimeters or less. The distance LA from the first wall 68A to the second wall 70A is substantially equal to a distance LB from the first end surface 42A of the hub 42 to the second end surface 42B. Preferably, the outer circumferential wall 68B includes a large diameter portion 68C and a small diameter portion 68D. The large diameter portion 68C has an inner diameter that defines a first inner diameter, and the small diameter portion 68D has an inner diameter that defined a second diameter that is smaller than the first inner diameter. Preferably, the inner diameter of the large diameter portion 68C is 101% to 105% of the inner diameter of the small diameter portion 68D. The inner diameter of the large diameter portion 68C is, for example, 106.5 millimeters, and the inner diameter of the small diameter portion 68D is 105 millimeters. For example, the small diameter portion 68D is provided on a portion adjacent to the first wall 68A. The small diameter portion 68D is provided on a portion where the pin members on the first wall 68A are located in the axial direction A of the hub 42. The small diameter portion 68D has a length LC1 in the axial direction A of the hub 42. The length LC1 is less than length LC2 of the large diameter portion 68C in the axial direction A of the hub 42. Preferably, the length LC1 of the small diameter portion 68D in the axial direction A of the hub 42 is greater than the axial length of the pin members provided on the first wall 68A.

The projections 66 are spaced apart from the outer circumferential wall 68B. The diameter of the small diameter portion 68D is greater than the diameter of the circle CX. Preferably, the diameter of the small diameter portion 68D is slightly greater than the diameter of the first flange 50.

The second portion 70 is configured to be separable into a first segment 72 and a second segment 74. The first segment 72 and the second segment 74 are each arc-shaped. Preferably, the first segment 72 and the second segment 74 have the same shape. The second portion 70 is attached in the opening of the outer circumferential wall 68B of the first portion 68.

Preferably, the wheel unit 60 further includes a plurality of spokes 76. The accommodation portion 62 further includes a plurality of spoke engagement portions 78 engaged with the spokes 76. The accommodation portion 62 further includes an accommodation portion flange 80. The accommodation portion flange 80 projects from the outer circumferential portion of the outer circumferential wall 68B of the first portion 68 outward in a radial direction of the hub 42. The accommodation portion flange 80 includes a first accommodation portion flange 80A and a second accommodation portion flange 80B located on a position differing from that of the first accommodation portion flange 80A in the axial direction A of the hub 42. The spoke engagement portions 78 are provided on each of the first accommodation portion flange 80A and the second accommodation portion flange 80B. Preferably, the spoke engagement portions 78 are equal in number to the projections 66.

The wheel unit 60 further includes one or more attaching members 82 that attach the first portion 68 and the second portion 70 to each other. The number of the one or more attaching members 82 is less than the number of the projections 66. The attaching members 82 are provided on the accommodation portion 62 outward from the first engagement portion 64 in the radial direction of the hub 42. The attaching members 82 are provided on the accommodation portion 62 inward from the spoke engagement portions 78 in the radial direction of the hub 42. Preferably, the number of the attaching members 82 is less than the number of the spoke engagement portion 78. The number of the attaching members 82 is, for example, 2 or greater and 10 or less. The number of the attaching members 82 is, for example, 6.

The first portion 68 includes a first attaching portion 84 configured to engage with the attaching members 82. The first attaching portion 84 is provided on the second accommodation portion flange 80B. The second portion 70 includes a second attaching portion 86 configured to engage with the attaching members 82. Each attaching member 82 includes a male threaded portion. One of the first attaching portion 84 and the second attaching portion 86 includes holes, and the other one of the first attaching portion 84 and the second attaching portion 86 includes female threaded portions. In one example, each attaching member 82 includes a male threaded portion, the first attaching portion 84 includes female threaded portions, and the second attaching portion 86 includes holes. In a case where the attaching members 82 are inserted into the second attaching portion 86 and threaded into the first attaching portion 84, the second portion 70 is attached to the first portion 68. Preferably, the male threaded portion of the attaching member 82 has an outer diameter that is larger than the outer diameter of the pin member of the projection 66.

Preferably, the wheel unit 60 includes a human-powered vehicle component attachment structure 88 for attachment of a human-powered vehicle component 90. Here, the human-powered vehicle component 90 is a braking device 92 and the human-powered vehicle component attachment structure 88 includes a groove 88A or a hole provided in an end of the accommodation portion 62. The groove 88A is formed between the first segment 72 and the second segment 74. The braking device 92 includes, for example, a disc brake rotor 92A. The disc brake rotor 92A includes a projection 92B that is fitted into the human-powered vehicle component attachment structure 88. The human-powered vehicle component attachment structure 88 is not limited to one or more grooves or holes. Other types of fastening structures can be used as the human-powered vehicle component attachment structure 88 for attaching a human-powered vehicle component to the wheel unit 60.

A process for attaching the hub 42 to the wheel unit 60 will now be described.

In a first step, in a state in which the second portion 70 is removed from the first portion 68, the hub 42 is inserted along the inner circumferential surface of the outer circumferential wall 68B of the first portion 68, and the pin members of the projections 66A provided on the first wall 68A are inserted into the holes 50B of the second engagement portion 50A provided in the first flange 50 of the hub 42. In a case where the diameter of the second rotary body 28 is greater than the diameter of the first hole 62A of the accommodation portion 62, the hub 42 is inserted into the first portion 68 in a state in which the second rotary body 28 is removed from the hub 42 in the first step. In this case, the second rotary body 28 is coupled to the hub 42 after the hub 42 is accommodated in the first portion 68.

In a second step, the pin members of the projections 66B provided on the second wall 70A of the second portion 70 are inserted into the holes 50B of the second engagement portion 52A provided in the second flange 52 of the hub 42. In the second step, the pin members provided on each of the first segment 72 and the second segment 74 of the second portion 70 are inserted into the holes 50B of the second engagement portion 52A provided in the second flange 52 of the hub 42 so that the pin members provided on the second portion 70 are all inserted into the hole 50B.

In a third step, the attaching members 82 are engaged with the first attaching portion 84 and the second attaching portion 86 so that the first portion 68 is attached to the second portion 70.

With the wheel unit 60, the spokes 76 do not have to be directly coupled to the holes 48B of the hub 42 in order to replace the hub 42. With the wheel unit 60, the first engagement portion 64 is configured to correspond with the arrangement and diameter of holes in a spoke attaching portion of a typical hub. Thus, the first engagement portion 64 is highly versatile.

Modifications

The description related with the above embodiment exemplifies, without any intention to limit, an applicable form of a human-powered vehicle wheel unit and a human-powered vehicle wheel assembly according to the present disclosure. In addition to the embodiment described above, the human-powered vehicle wheel unit and the human-powered vehicle wheel assembly according to the present disclosure are applicable to, for example, modifications of the above embodiment that are described below and combinations of at least two of the modifications that do not contradict each other. In the modifications described hereafter, same reference numerals are given to those components that are the same as the corresponding components of the above embodiment. Such components will not be described in detail.

The spokes 76 can be omitted from the wheel unit 60. In this case, for example, a rim is connected to the accommodation portion 62. The rim can be formed integrally with the accommodation portion 62.

The projections 66 do not have to be pin members. For example, the projections 66 can each be a boss having a cross section that is orthogonal to the axial direction A of the hub 42 and reduced in size as the first wall 68A becomes farther. The projections 66 can employ any shapes as long as the shape is engageable with the holes 48B or the recesses in the second engagement portion 48A. In this case, it is preferred that the projections 66 have a length that is 1 millimeter or greater and 20 millimeters or less in the axial direction A of the hub 42.

The first engagement portion 64 can include a plurality of recesses or holes, and the second engagement portion 48A can include a plurality of projections. Also, in this case, the first engagement portion 64 and the second engagement portion 48A readily attach the hub 42 including the projections to the wheel unit 60.

The number of the projections 66 can be less than the number of the holes 48B or greater than the number of the holes 48B.

The wheel unit 60 can further include a spacer provided between the first portion 68 and the second portion 70. The spacer includes, for example, an elastic member.

Each attaching member 82 can include a male threaded portion and a nut. In this case, the first attaching portion 84 and the second attaching portion 86 can each include holes.

In the first step, in a case where the hub 42 is inserted into the first portion 68 in a state in which the second rotary body 28 is removed from the hub 42, the second rotary body 28 can be coupled to the hub 42 after the first step, the second step, or the third step. In a case where the diameter of the second rotary body 28 is smaller than the diameter of the first hole 62A of the accommodation portion 62, the hub 42 can be inserted into the first portion 68 in a state in which the second rotary body 28 is removed from the hub 42 in the first step.

In understanding the scope of the present disclosure, the phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A human-powered vehicle wheel unit adapted to be attached to a human-powered vehicle hub, the human-powered vehicle wheel unit comprising:
    an accommodation portion configured to accommodate at least part of the human-powered vehicle hub;
    a first engagement portion provided on the accommodation portion, the first engagement portion being configured to transmit rotation of the human-powered vehicle hub to the accommodation portion through engagement with a second engagement portion provided on a flange projecting from an outer circumferential portion of a hub shell of the human-powered vehicle hub; and
    a plurality of spokes,
    the accommodation portion further including a plurality of spoke engagement portions engaged with the spokes, the plurality of spokes not being directly coupled to the human-powered vehicle hub.

2. The human-powered vehicle wheel unit according to claim 1, wherein
    one of the first engagement portion and the second engagement portion includes a plurality of projections projecting in an axial direction of the human-powered vehicle hub, and
    the other one of the first engagement portion and the second engagement portion includes a plurality of holes or a plurality of recesses engaged with the projections.

3. The human-powered vehicle wheel unit according to claim 2, wherein
    the accommodation portion includes a first portion and a second portion that is attached to the first portion.

4. The human-powered vehicle wheel unit according to claim 3, wherein
    the first portion and the second portion are aligned in an axial direction of the human-powered vehicle hub,
    the first portion includes a first wall configured to contact a first end surface of the human-powered vehicle hub in the axial direction of the human-powered vehicle hub,
    the second portion includes a second wall configured to contact a second end surface of the human-powered vehicle hub in the axial direction of the human-powered vehicle hub, and
    the second portion is attached to the first portion in a state in which at least part of the human-powered vehicle hub is accommodated in the accommodation portion so that the accommodation portion restricts movement of the human-powered vehicle hub relative to the accommodation portion in the axial direction.

5. The human-powered vehicle wheel unit according to claim 4, wherein
    the projections are provided on each of the first portion and the second portion.

6. The human-powered vehicle wheel unit according to claim 5, wherein
    the projections are provided on each of the first wall of the first portion and the second wall of the second portion.

7. The human-powered vehicle wheel unit according to claim 6, wherein
    a number of the projections provided on the first wall and a number of the projections provided on the second wall are each included in a range of 10 or greater to 25 or less.

8. The human-powered vehicle wheel unit according to claim 6, wherein
    the projections are provided on each of the first wall and the second wall in a circumferential direction of the human-powered vehicle hub.

9. The human-powered vehicle wheel unit according to claim 8, wherein
    the projections are provided on the first wall with a phase in a circumferential direction of the wheel unit differing from that of the projections provided on the second wall.

10. The human-powered vehicle wheel unit according to claim 5, wherein
    the projections are provided on each of the first wall and the second wall along a circle having a diameter included in a range of 50 millimeters or greater to 300 millimeters or less.

11. The human-powered vehicle wheel unit according to claim 10, wherein
    the projections are provided on each of the first wall and the second wall along a circle having a diameter included in a range of 50 millimeters or greater to 120 millimeters or less.

12. The human-powered vehicle wheel unit according to claim 5, wherein
    the first wall and the second wall are spaced apart by a distance included in a range of 40 millimeters or greater to 70 millimeters or less.

13. The human-powered vehicle wheel unit according to claim 5, wherein the first portion further includes a circumferential wall that is continuous with the first wall and surrounds an outer circumferential portion of the human-powered vehicle hub, and the second portion is attached to an end of the circumferential wall on a side opposite to the first wall in the axial direction of the human-powered vehicle hub.

14. The human-powered vehicle wheel unit according to claim 13, wherein the projections are spaced apart from the circumferential wall.

15. The human-powered vehicle wheel unit according to claim 13, wherein the circumferential wall includes a large diameter portion having an inner diameter defining a first inner diameter and a small diameter portion having an inner diameter defining a second inner diameter that is smaller than the first inner diameter.

16. The human-powered vehicle wheel unit according to claim 5, wherein the second portion is configured to be separable into a first segment and a second segment.

17. The human-powered vehicle wheel unit according to claim 5, further comprising one or more attaching members that attach the first portion and the second portion, wherein a number of the one or more attaching members is less than a number of the projections.

18. The human-powered vehicle wheel unit according to claim 17, wherein the attaching members are provided on the accommodation portion outward from the first engagement portion with respect to a radial direction of the human-powered vehicle hub.

19. The human-powered vehicle wheel unit according to claim 17, wherein the attaching members are less in number than the spoke engagement portions.

20. The human-powered vehicle wheel unit according to claim 2, wherein the projections are a plurality of pin members extending in the axial direction of the human-powered vehicle hub.

21. The human-powered vehicle wheel unit according to claim 20, wherein the pin members each have a diameter of 1 millimeter or greater and 5 millimeters or less.

22. The human-powered vehicle wheel unit according to claim 20, wherein the pin members each have an axial length of 1 millimeter or greater and 20 millimeters or less.

23. The human-powered vehicle wheel unit according to claim 20, wherein the pin members are formed integrally with the accommodation portion.

24. The human-powered vehicle wheel unit according to claim 2 wherein the spoke engagement portions are equal in number to the projections.

25. The human-powered vehicle wheel unit according to claim 1, wherein the accommodation portion includes a first portion and a second portion attached to the first portion, the first portion and the second portion are aligned in the axial direction of the human-powered vehicle hub, the first portion includes a first wall configured to contact a first end surface of the human-powered vehicle hub in the axial direction of the human-powered vehicle hub, the second portion includes a second wall configured to contact a second end surface of the human-powered vehicle hub in the axial direction of the human-powered vehicle hub, the second portion is attached to the first portion in a state in which at least part of the human-powered vehicle hub is to be accommodated in the accommodation portion so that the accommodation portion restricts movement of the human-powered vehicle hub relative to the accommodation portion in the axial direction when the human-powered vehicle hub is attached to the accommodation portion, the flange of the human-powered vehicle hub includes a first flange and a second flange located in the axial direction of the human-powered vehicle hub at a position differing from that of the first flange, the first end surface is provided on the first flange, and the second end surface is provided on the second flange.

26. The human-powered vehicle wheel unit according to claim 1, further comprising a restriction portion that restricts movement of the human-powered vehicle hub relative to the wheel unit by sandwiching the human-powered vehicle hub from one side and another side in the axial direction of the human-powered vehicle hub.

27. The human-powered vehicle wheel unit according to claim 1, further comprising a human-powered vehicle component attachment structure.

28. The human-powered vehicle wheel unit according to claim 27, wherein the human-powered vehicle component attachment structure includes a groove or a hole provided in an end of the accommodation portion to attach a braking device.

29. A human-powered vehicle wheel assembly comprising the human-powered vehicle wheel unit to claim 1, and further comprising:

the human-powered vehicle hub.

30. A human-powered vehicle wheel unit adapted to be attached to a human-powered vehicle hub, the human-powered vehicle wheel unit comprising:

an accommodation portion configured to accommodate at least part of the human-powered vehicle hub, the accommodation portion including a first portion and a second portion attached to the first portion by a plurality of threaded fasteners; and a first engagement portion provided on the accommodation portion, the first engagement portion is configured to transmit rotation of the human-powered vehicle hub to the accommodation portion through engagement with a second engagement portion provided on the human-powered vehicle hub, one of the first engagement portion and the second engagement portion includes a plurality of projections projecting in an axial direction of the human-powered vehicle hub, the plurality of projections being integrally formed with the accommodation portion, and the other one of the first engagement portion and the second engagement portion includes a plurality of holes or a plurality of recesses engaged with the projections.

31. The human-powered vehicle wheel unit according to claim 30, wherein the second engagement portion is provided on a flange projecting from an outer circumferential portion of a hub shell of the human-powered vehicle hub.

32. A human-powered vehicle wheel unit adapted to be attached to a human-powered vehicle hub, the human-powered vehicle wheel unit comprising:

an accommodation portion configured to accommodate at least part of the human-powered vehicle hub, the accommodation portion including a first portion and a second portion attached to the first portion by a plurality of fasteners; and a first engagement portion provided on the accommodation portion, the first engagement portion is configured to transmit rotation of the human-powered vehicle hub to the accommodation portion through engagement with a second engagement portion provided on the human-powered vehicle hub, one of the first engagement portion and the second engagement portion includes a plurality of projections projecting in an axial direction of the human-powered vehicle hub, the plurality of projections being integrally formed with the accommodation portion, the other one of the first engagement portion and the second engagement portion includes a plurality of holes or a plurality of recesses engaged with the projections, and the plurality of fasteners being disposed radially outward of the plurality of projections.

33. The human-powered vehicle wheel unit according to claim 32, wherein the second engagement portion is provided on a flange projecting from an outer circumferential portion of a hub shell of the human-powered vehicle hub.

* * * * *